(12) United States Patent
Jones et al.

(10) Patent No.: US 6,836,333 B1
(45) Date of Patent: Dec. 28, 2004

(54) FOURIER TRANSFORM SPECTROMETER USING AN OPTICAL BLOCK

(75) Inventors: Robert Jones, Cambridge (GB); Michael Stuart Hazell, Cambridge (GB)

(73) Assignee: Cambridge Consultants Limited (GB)

( * ) Notice: Subject to any disclaimer, the term of this patent is extended or adjusted under 35 U.S.C. 154(b) by 296 days.

(21) Appl. No.: 10/031,948

(22) PCT Filed: Jul. 27, 2000

(86) PCT No.: PCT/GB00/02898
§ 371 (c)(1),
(2), (4) Date: Jun. 21, 2002

(87) PCT Pub. No.: WO01/07879
PCT Pub. Date: Feb. 1, 2001

(30) Foreign Application Priority Data

Jul. 27, 1999 (GB) .............................. 9917610

(51) Int. Cl.⁷ ............................................... G01B 9/02
(52) U.S. Cl. ..................................................... 356/451
(58) Field of Search ................................. 356/451, 455; 250/337.08, 339.07

(56) References Cited

U.S. PATENT DOCUMENTS 5,223,910 A * 6/1993 Simeoni et al. ............. 356/456
5,541,728 A * 7/1996 Dierking ..................... 356/451

FOREIGN PATENT DOCUMENTS

DE 197 49 377 A1 6/1999

* cited by examiner

Primary Examiner—Samuel A. Turner
Assistant Examiner—Patrick Connolly
(74) Attorney, Agent, or Firm—Finnegan, Henderson, Farabow, Garrett & Dunner, L.L.P.

(57) ABSTRACT

The invention concerns an interferometric optical block for Fourier Transform spectrometers having three planar nominally parallel surfaces with the two outer surfaces adapted to act as beam reflectors for internal light and the third surface in operation acting as a beam splitter and beam combiner, the optical block having an input portion by means of which an input beam of light to be analysed can be input so as partially to pass through said third surface to be internally reflected by one of said outer reflectors, and partially to be reflected by said third surface so as then to be internally reflected by the other of said outer reflectors whereby light internally reflected by said outer reflectors is combined at said third surface to produce an exit beam, and wherein said outer surfaces have an inclination with respect to one another so as to make a variation in path lengths in the light forming the exit beam so as to generate an interference fringe field.

20 Claims, 14 Drawing Sheets

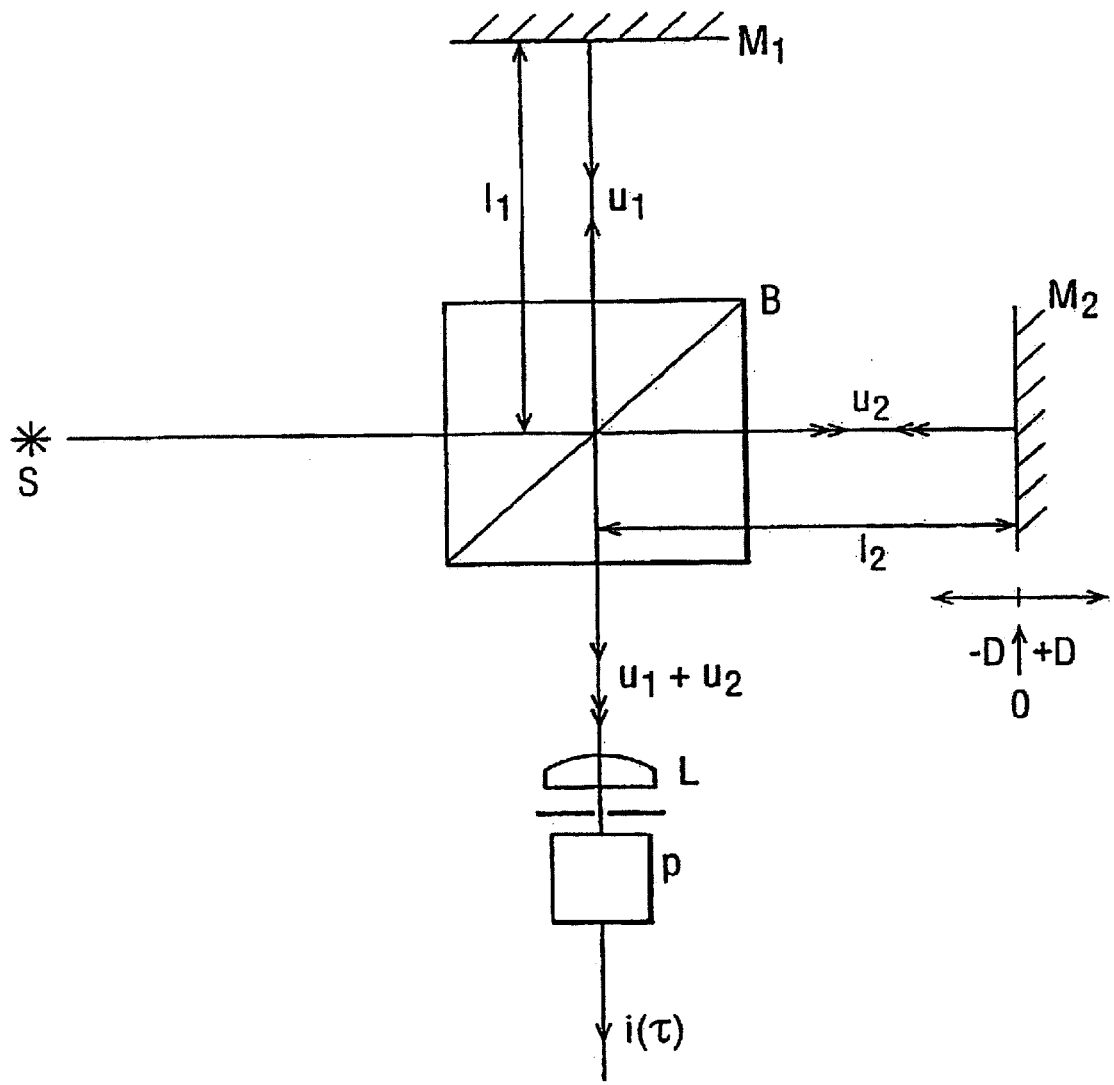

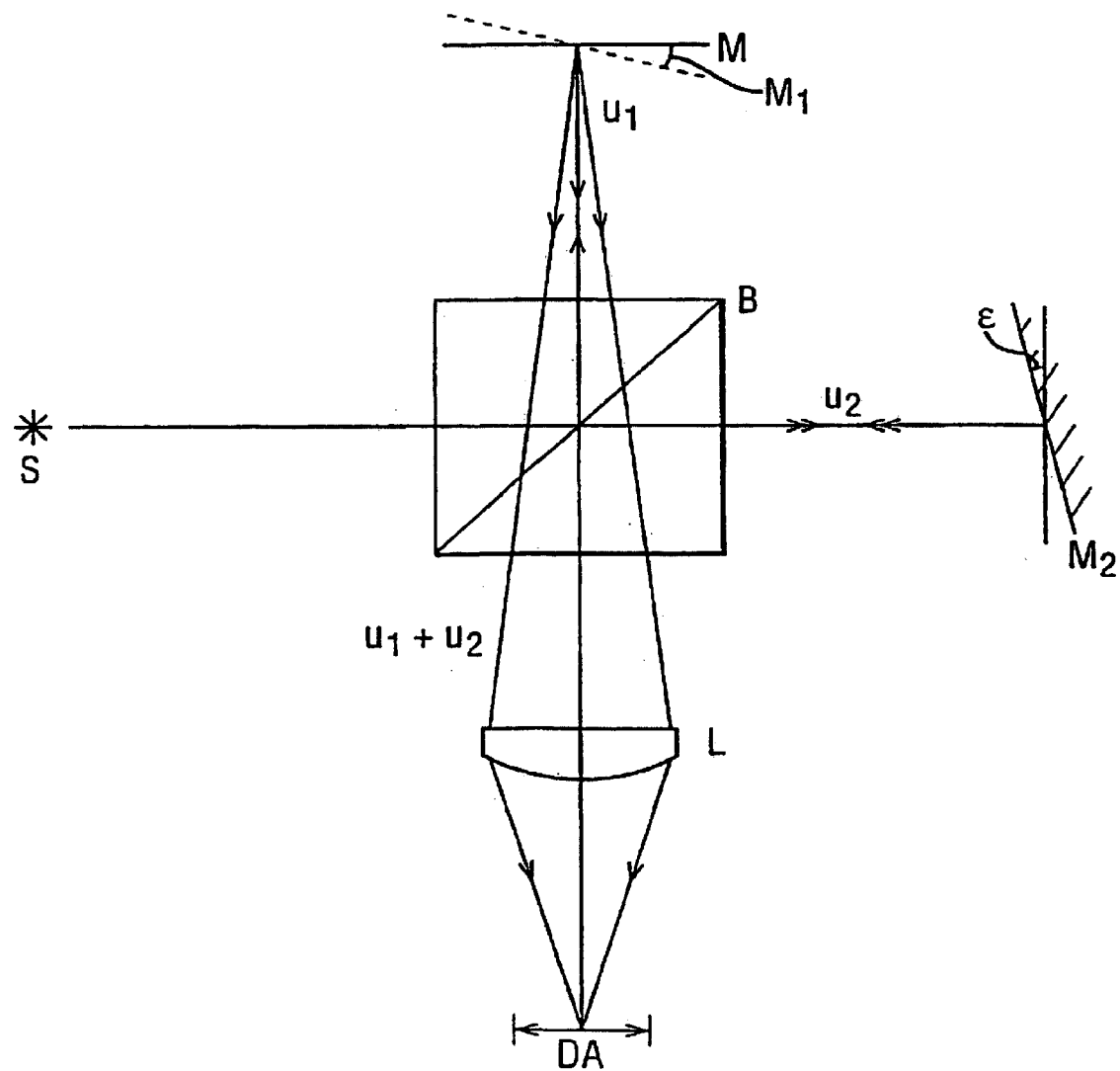

FIG. 6(A)
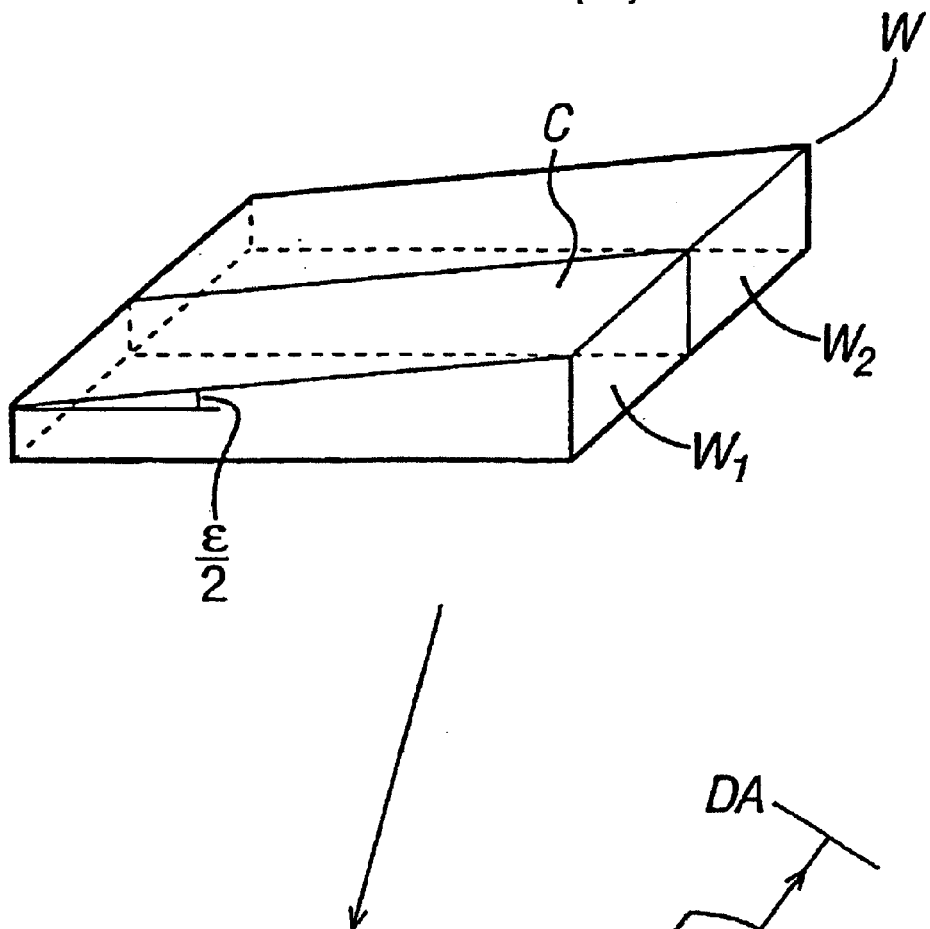
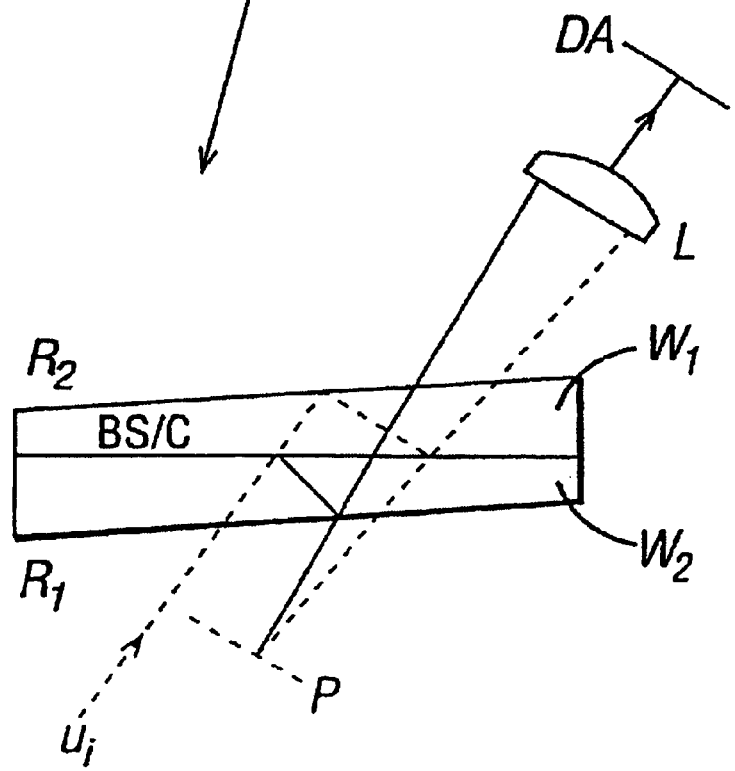
FIG. 6(B)

ROYAL BLUE (FILTER 007)

US 6,836,333 B1

FOURIER TRANSFORM SPECTROMETER USING AN OPTICAL BLOCK

CROSS REFERENCE TO RELATED APPLICATIONS

This application is a national phase application based on international application No. PCT/GB00/02898, filed on Jul. 27, 2000, and claims the priority of British Patent Application No. 9917610.9, filed on Jul. 27, 1999.

The present invention concerns interferometers and is particularly concerned, with Fourier transform spectrometers. Fourier transform spectroscopy is a well known technique for obtaining the spectra of weak extended sources. It offers throughput and multiplex advantages which can give rise to superior signal-to-noise performance when compared to other methods.

As a result there has been an increasing demand for Fourier transform spectrometers over a wide range of applications including industrial, medical, environmental and consumer applications.

Accordingly there has been a trend of simplifying and ruggidising spectrometer instrumentation to enable it to be used in an extended range of applications. There is however a trade-off between performance and cost associated which tends to limit the range of applications of emerging products.

The present invention is particularly concerned with providing an extremely simple and robust component for a spectrometer as well as improved Fourier Transform Spectrometers.

In one aspect the invention provides optical block in which light to be analysed is internally reflected and combined to produce an interference fringe pattern which can be measured to provide a spectral analysis of the light.

In order that the invention may be more readily understood embodiments thereof, and of the prior art, will now be described by way of example and with reference to the accompanying drawings in which:

FIG. 1 is a schematic view of a known Michelson interferometer;

FIG. 3 is a schematic diagram of another known form of interferometer;

FIGS. 6A and 6B shows steps in the manufacture of the optical block of FIG. 5;

Figure 2B:
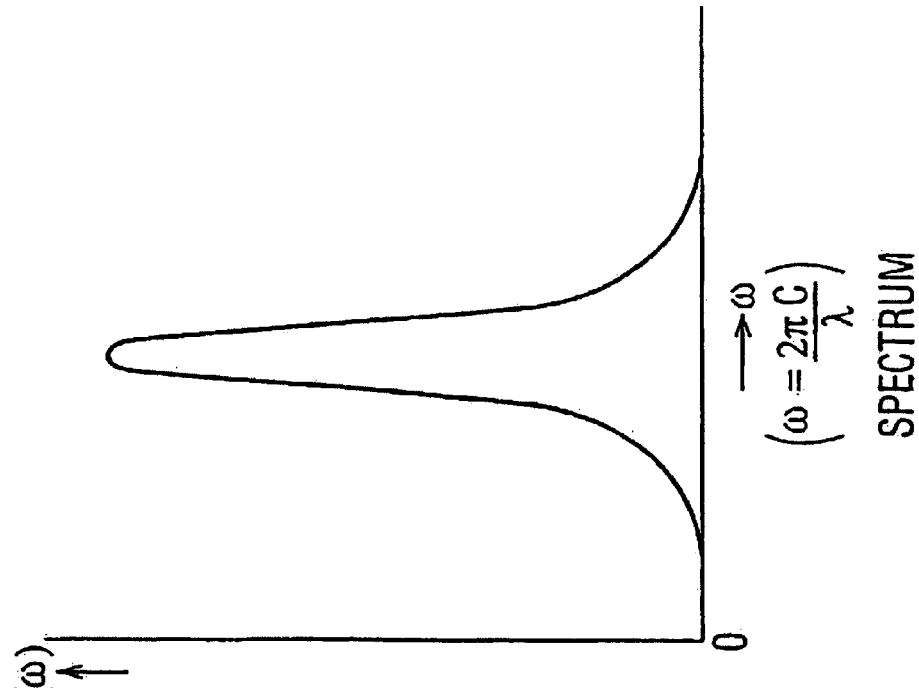
FIGS. 2A and 2B show respectively a fringe function and a spectrum.
Figure 2A:
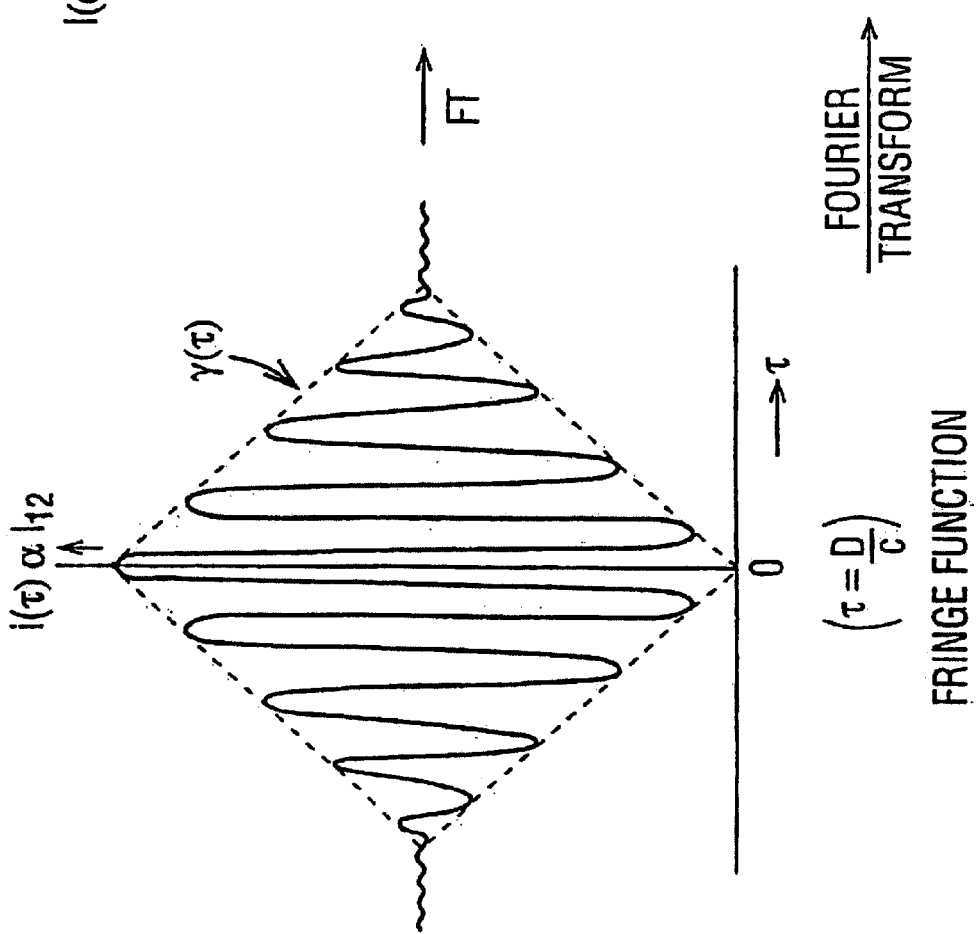

Referring now to FIG. 1 this shows the conventional form of an instrument based on a Michelson interferometer. In this arrangement the interference fringe field formed due to the superposition of the light field $U_1$ and $U_2$ reflected respectively from the mirrors $M_1$ and $M_2$ via the beam splitter B is incident on a light sensitive detector P. The aperture of this detector is made considerably smaller than the fringe spacing in the plane of detection. The output of this detector thereby defines the interference fringe intensity distribution generated as the mirror $M_2$ is translated. In Fourier transform spectroscopy this translation is arranged to occur over a distance ±D about the point where the path length in the translated arm of the interferometer $l_2$, matches that of the other arm, $I_1$. FIG. 2 shows the form of the fringe envelope observed under these conditions where i (τ) is photo current of the detector P as a function of the mirror displacement ±D. Note that i (τ) is proportional to the interference fringe pattern $$I_{12} = I_1 + I_2 \times 2\sqrt{I_1 I_2}\, \gamma(\tau) \frac{4\Pi D}{\lambda} \quad (1)$$

where
$I_1$=intensity of interfering beam $U_1$
$I_2$=intensity of interfering beam $U_2$
$\gamma(\tau)$=coherence function of source
τ=D/C
λ=wavelength at light
c=speed of light
$\gamma(\tau)$ is equal to the correlation of the two beams of light with a relative delay time τ=D/c i.e.

$$\gamma(\tau)=f(t)f^*(t+\tau)/|f(t)|^2 \quad (2)$$

Where
f(t)=defines interfering waveform as function of time, t.

By the Wiener-Khinchin theory, the Fourier transform of $\gamma(\tau)$ is equivalent to the spectral intensity I(ω). Hence the Fourier transform of the fringe function generated in the specific way described provides a measure of the spectral distribution of the input light field as is shown schematically in FIG. 2. It may be shown that the resolution of this type of spectrometer is given by $$\left(\frac{\delta\lambda}{\lambda}\right)_{min} = \frac{\lambda}{2D_{max}} \quad (3)$$

where $D_{max}$=maximum amplitude of mirror displacement

Hence a value of D=100 μm will generate a wavelength resolution of under 1 nm for λ=500 nm.

In practice the translation mechanism has to be extremely precise in order to minimise variations in the fringe spacing and vibration across the detector since such variations also cause a modulation of the fringe envelope and introduce errors in the resultant spectrum. This problem is usually minimized by the use of corner cube reflectors but nonetheless these are expensive the instrument still requires a precision positional encoder to define the transform time scale (D/c).

Moving parts can be eliminated by using the arrangement shown in FIG. 3 in which the mirror $M_2$ is rotated by an angel $\epsilon$ about an axis co-incident with the zero-order fringe. A distributed fringe field is then observed which is imaged in the plane of a pixellated detector array DA by the lens L. The fringe field envelope is then defined by the spatially scanned output of the detector array and is equivalent of that shown in FIG. 2 but does not require the translation of a mirror.

Various configurations of interferometer are described in the prior art which are aimed at simplifying and ruggedising the extended fringe field interferometer described above. These include the use of a polarising/birefringent elements to reduce the system to a common path interferometer and a common path, contra propagating three element Sagnac configuration.

Figure 4:
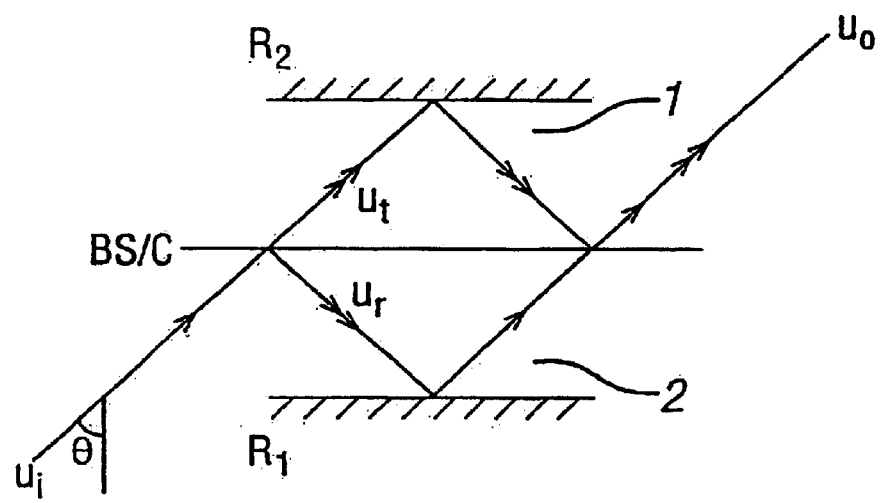
FIG. 4 shows the basic component of an optical block in accordance with a first embodiment of the present invention.

Referring now to FIG. 4 of the drawings this shows an optical block which comprises two optical elements 1 and 2 which may be fabricated from conventional good quality optical materials such as BK7 glass. The term optical block is used to define the optical components in which the interference fringe field is actually generated.

The optical block shown in FIG. 4 has a common central element BS/C which acts as a beam splitter and combiner and is placed between reflectors $R_1$ and $R_2$. The planes of $R_2$, BS/C and $R_1$ are nominally parallel and $R_1$ and $R_2$ separated by a distance of respectively $S_1$ and $S_2$ from BS/C. An input beam $U_1$ of diameter $a_i$ is incident at angle $\theta$ to the surface normal of BS/C such that adjacent beams incident on $R_1$ and $R_2$ do not overlap. This requires that $\theta > \sin^{-1} 2S_{1,2}/a_1$. Under these conditions it can be seen that two beam interference will occur between various combinations of beam propagating through and exiting from the $R_1$, $R_2$. BS/C structure (e.g. at d and f).

Figure 5:
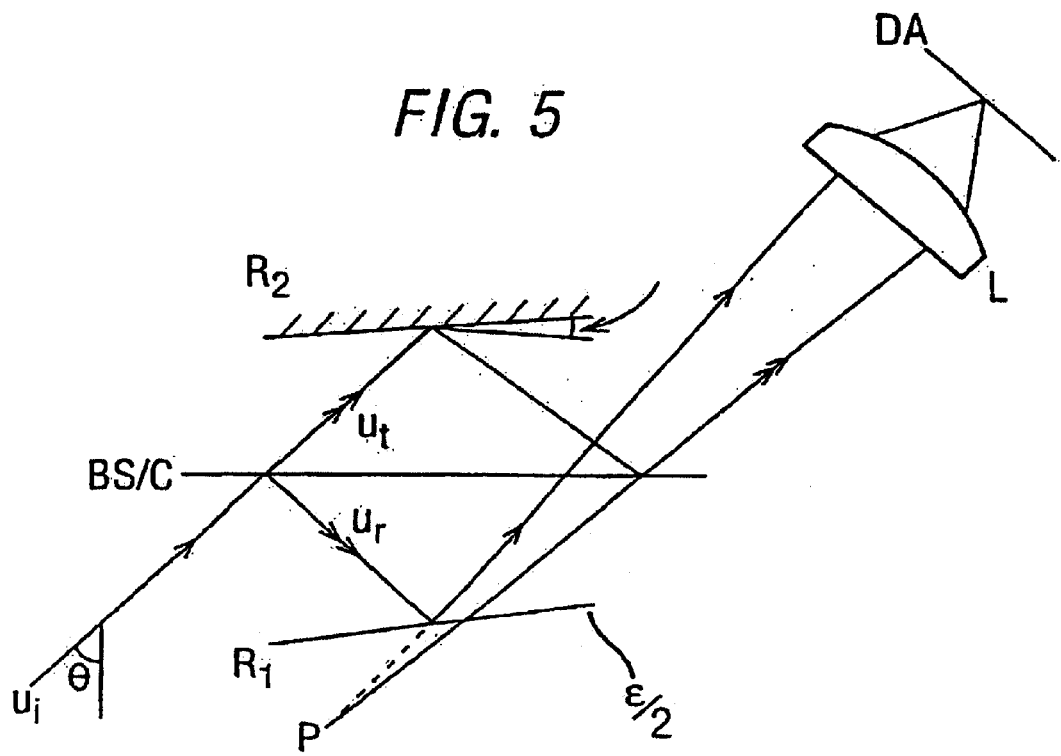
FIG. 5 is similar to FIG. 4.

In the embodiment shown in FIG. 4 the interfering beams are reflected once from the outer reflectors. The input beam is split at BS/C into the reflected and transmitted components $U_r$, $U_t$ respectively. These are in turn reflected from $R_1$ and $R_2$ and recombine at B/SC. The interferogram described by equation 1 is generated by arranging for the faces $R_1$ and $R_2$ to be inclined at a total angle $\epsilon$ with respect to one another. This is more clearly shown in FIG. 5 whilst ensuring that the zero order fringe for which $S_1 = S_2$ is nominally at the centre of the fringe field. The fringes will localise i.e. have maximum contrast in the plane which the interfering beams intersect as shown in FIG. 5. In practice a lens is used to form an image of the localised fringe field in the plane of the detector array.

A preferred embodiment of this interferometer may be fabricated from a single wedge cut into two wedges along the wedge section as show n in FIG. 6. One wedge is then rotated in its plane by 180° C. about the cut orientation and its lower face cemented to that of the other prism to form the monolithic element or optical block shown. An input beam 3, output lens 4 and sensor array 5 are also shown. In order to maximise the optical throughput the reflection coefficients of $R_1$ and $R_2$ should be as near 1.0 as possible and transmission (t) of reflection (r) coefficients of BS/C should both be equal to 0.5. The sensor array may be any suitable pixellated semiconductor array such as a CCD array.

Figure 7:
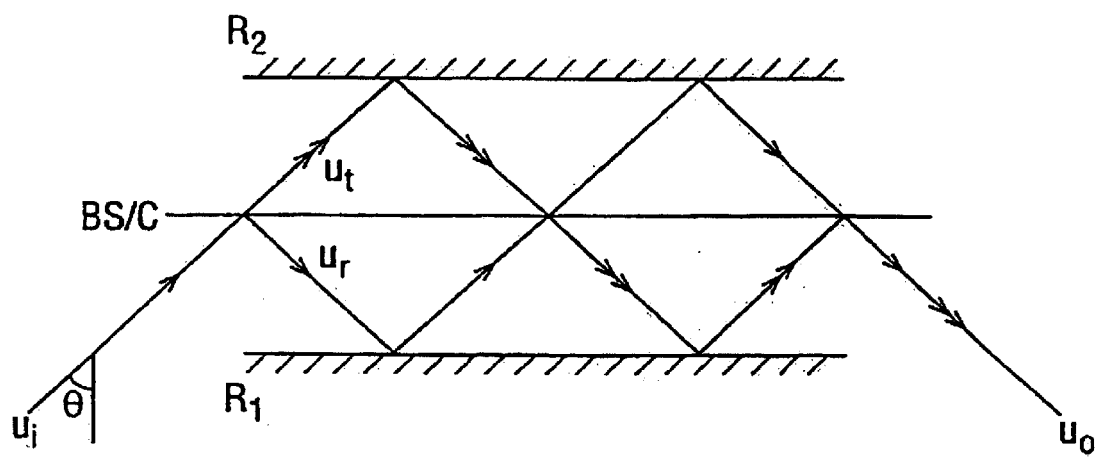
FIG. 7 is an illustration of a second embodiment of an optical block in accordance with the present invention.

A key objective in fabrication is to maintain repeatability of fringe geometry. In the above configuration this will depend upon the extent to which the wedge alignment and attachment process causes variations of the orientation of $R_1$ and $R_2$ relative to the reference wedge angle $\epsilon/2$. Sensitivity to alignment tolerance is relaxed relative to for interferometric precision required in the latter case when the number of reflections at $R_1$ and $R_2$ is extended from 1 to 2 as shown in FIG. 7. Under these conditions the interfering beams are common to $R_1$ and $R_2$ and relative misorientation of the latter do not therefore effect the fringe spacing.

Figure 8:
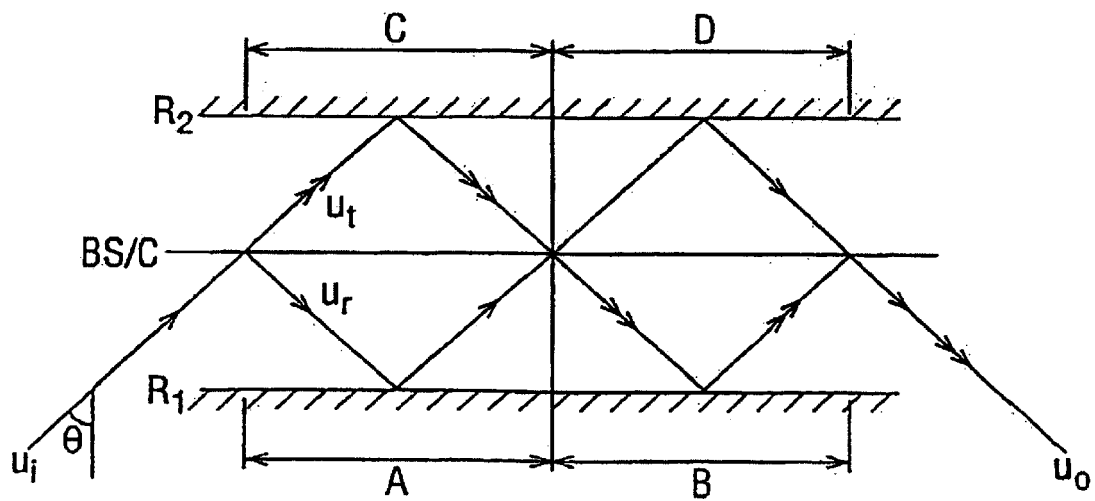
FIG. 8 is similar to FIG. 7.

An angular separation between the interfering beams in this dual reflection geometry is formed either by tilting one or a combination of the section of each reflector upon which an individual beam is incident. If the sections A,B,C,D of the reflectors shown in FIG. 8 delineate the regions over which there is no overlap of the incident beams they therefore define the sections that may be tilted relative to one another.

Figure 9:
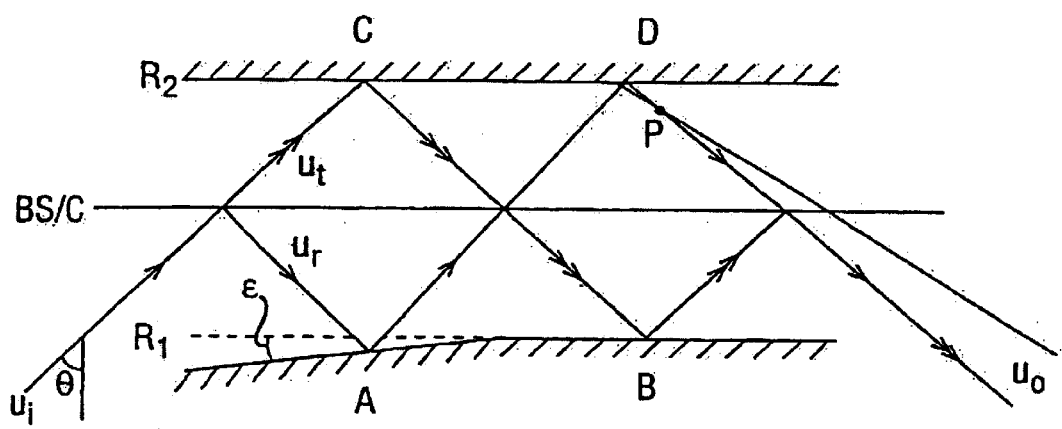
FIG. 9 is similar to FIG. 8 but has certain dimensions exaggerated in the interest of clarity.
Figure 10:
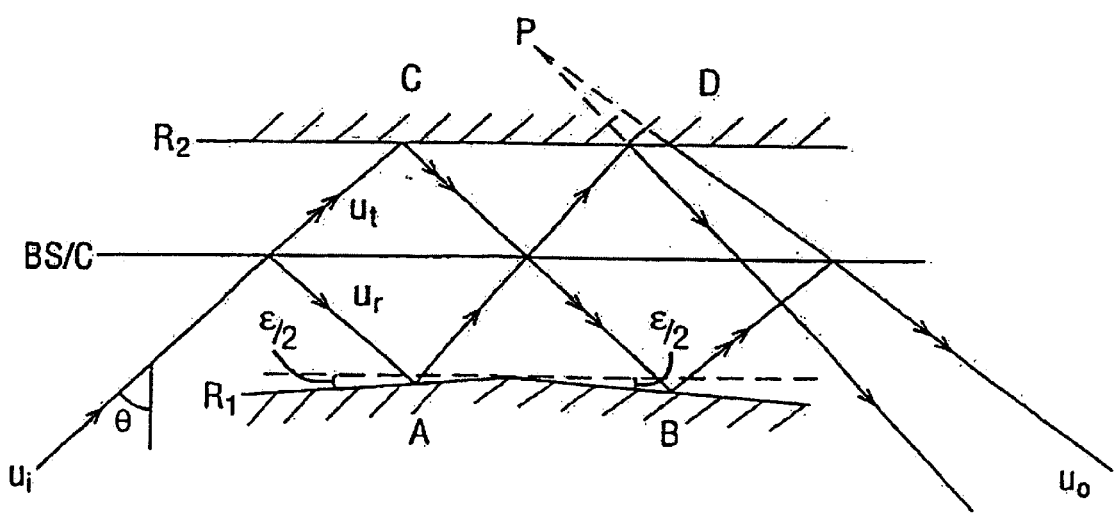
FIG. 10 is a diagram showing another embodiment of an optical block.

FIGS. 9 and 10 show respectively the arrangement in which section A and sections A&B are tilted. Here it will be noted that the only requirement when two sections are tilted is that the tilts be in an opposite sense so that the angular displacement created by the first is not compensated by the second. The position of the zero order fringe will also be a function of the relative tilt of the two reflectors since this will define the point for which the path lengths of the two interfering beams are equal. In the case of FIG. 9 (A tilted only) the zero fringe will occur at the extreme edge of the interference field. This position will shift towards the centre as B is tilted in the opposite sense (FIG. 10) and will be at the centre of the fringe field when the tilts of the two mirrors are equal. Note that a lateral shift of the dual angle reflector relative to the flat provides a means of fine tuning the position of the zero order fringe.

Figure 11:
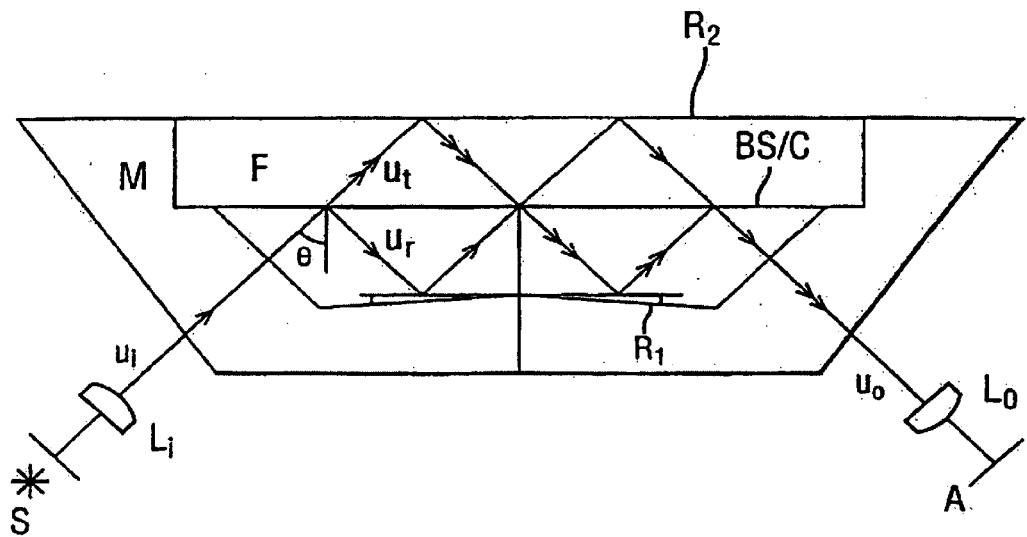
FIG. 11 is a diagram illustrating a particular practical realisation of an embodiment of an optical block in accordance with the present invention.

For one class of preferred configuration the tilts are confined to the $R_1$ element so that the BS/C and $R_2$ functions may be combined on a single optical flat with parallel faces. FIG. 11 illustrates how the optical block is formed by such an optical flat located on an element M which incorporate the symmetrically tilted reflector $R_1$. In practice M could be a precision moulded component and the optical block assembled by inserting the flat F in the pre-moulded location. This procedure is compatible with low cost components and manufacture since as has been noted above, this configuration of the optical block is not dependent on the precision location of $R_1$ with respect to $R_2$.

FIG. 11 also shows the additional components the system consisting of an extended source S (which may in practice consist at a large core optical fibre), collimating/focussing input lens $L_1$, output fringe and field imaging element $L_o$ and detector array A. These elements will, in general, be required for all geometries at the interferometer.

Figure 12:
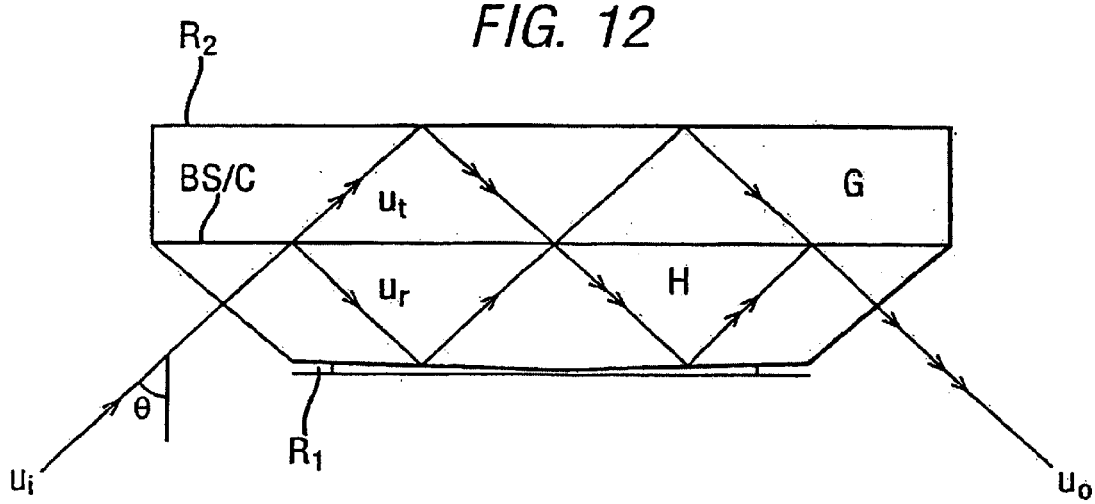
FIG. 12 is a diagram showing another practical implementation of an optical block in accordance with the present invention.
Figure 13:
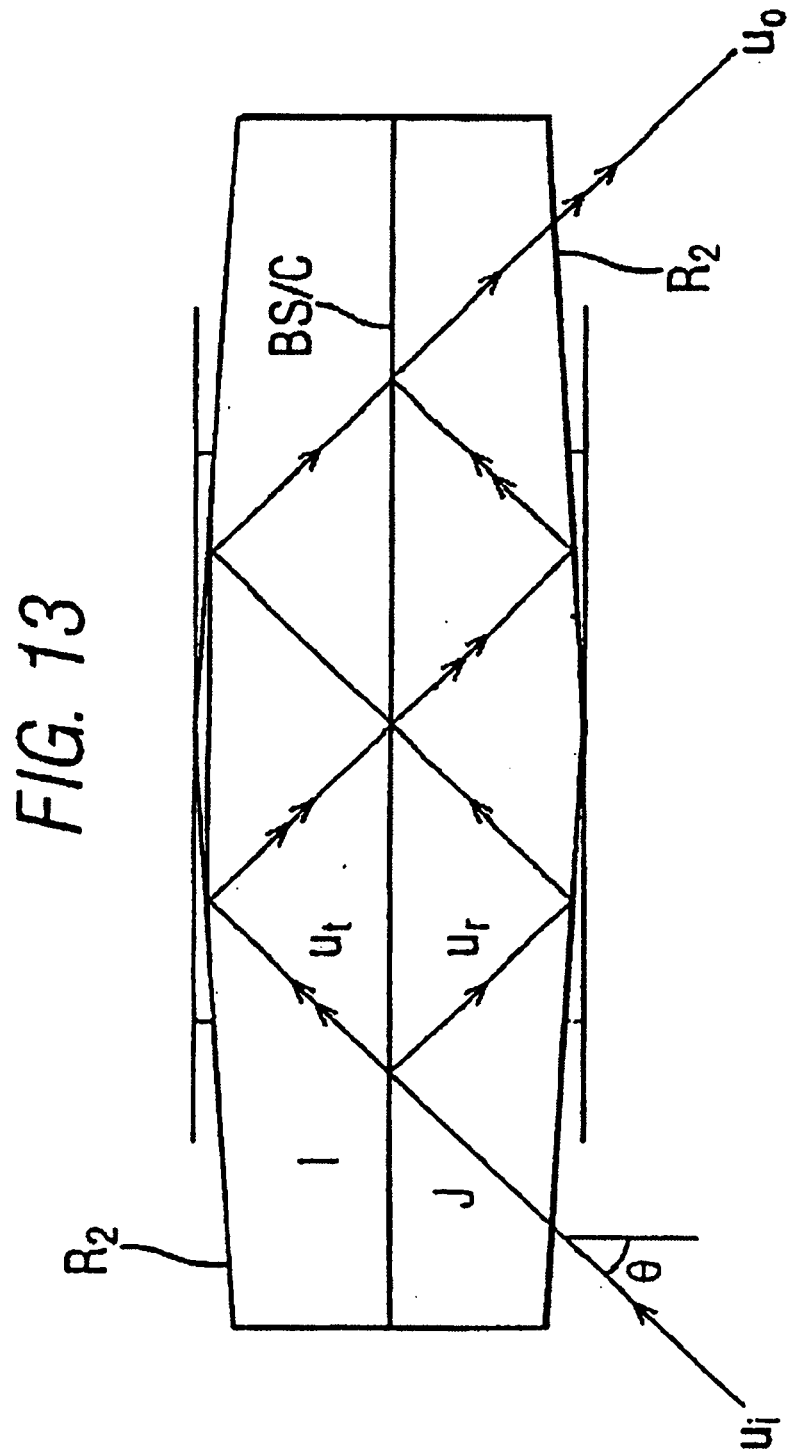
FIG. 13 is a diagram illustrating a third practical implementation of an optical block in accordance with the present invention.

FIG. 12 shows an alternative way of manufacturing the optical block in which the optical flat G is attached directly to the dual angle prism H. This arrangement is particularly robust and could, for example, be manufactured from low expansion glass to enable operation at elevated temperatures. FIG. 12 shows the same basic design in which all faces are mutually tilted. This configuration could be manufactured by slicing and rejoining a dual angle prism in accordance with the principle indicated in FIG. 7 for a single angle (i.e. wedge) prism.

In order to maximise the optical throughput the outer reflection $R_1$ and $R_2$ should have a coefficient of reflectivity as near to unity as possible and the reflection (r) and transmission coefficients r, t at BS/C should be respectively 0.33 and 0.66. These coefficients should apply over the spectral range of operation.

Figure 14:
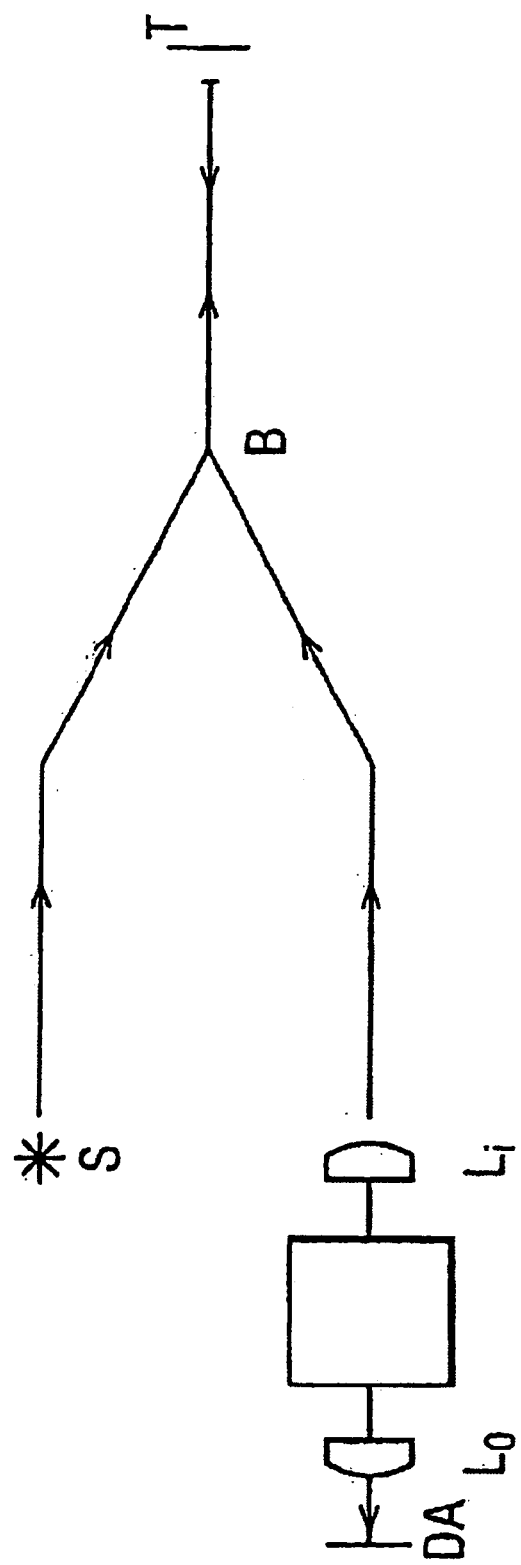
FIG. 14 is a diagram of spectrometer according to the present invention.

FIG. 14 shows schematically a typical practical implementation of the optical blocks just described in an interferometer. Here light from a source S is coupled to a region of test T via a beam splitter B.

In this configuration T may be a sample for which it is required to measure the spectral reflectivity. Alternatively T may be a passive reflector and the spectral transmission of the medium between the light delivery element and T measured. In either case light is coupled into the interferometer I via the current lens $L_1$ and imaged onto the detection array DA by the output lens $L_o$. In a preferred configuration all of the elements external to the interferometer may in practice be integrated with the structure at the optical block of the interferometer by combining, for example, moulded light guides and lenses with the reflective elements. The output of the detection array can be Fourier transform analysed in a well known manner by a suitable processor PC for display or printing.

Figure 15:
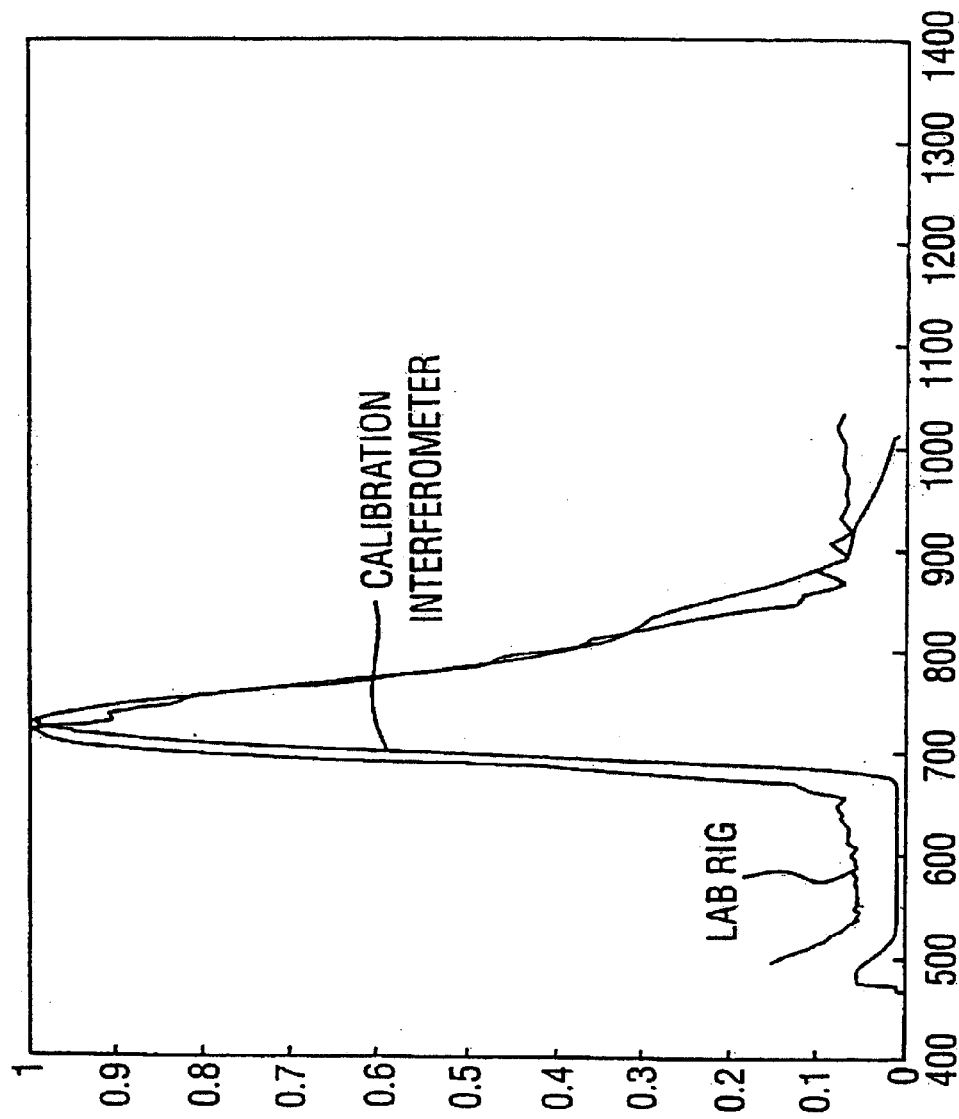
FIG. 15 shows two spectral waveforms.

FIG. 15 is an example of a preliminary experimental result which shows the spectrum of the same source measured using a calibrated spectrometer and that obtained using a laboratory version of the dual reflection spectrometer described above.

It will be appreciated that the optical blocks just described are compatible with robust monolithic fabrication of the two elements. With respect to the current state of the art it therefore reduces cost by eliminating the need for specialised components whilst simplifying manufacture by virtue of the reduction in component number.

Figure 16:
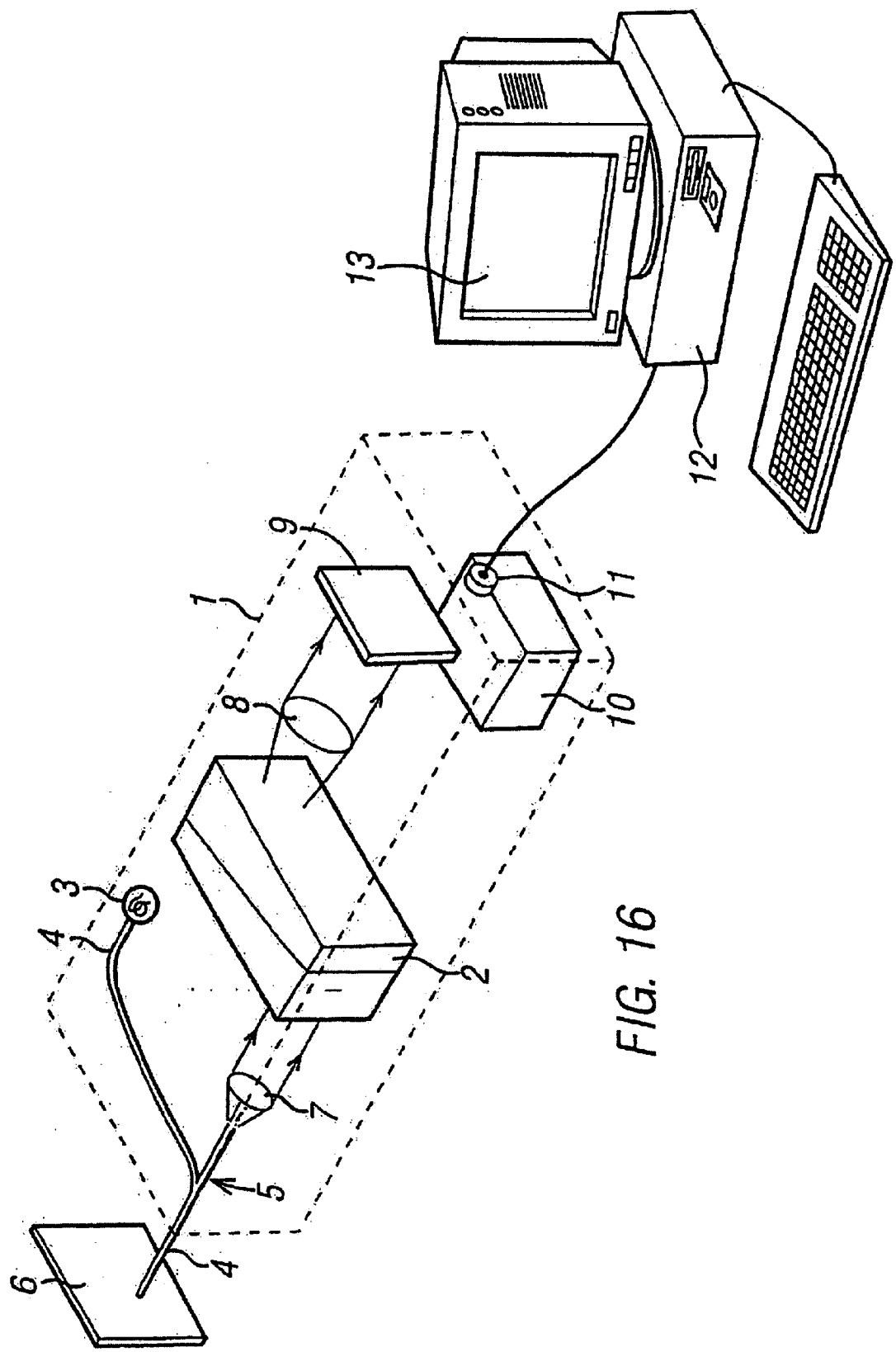
FIG. 16 is a diagrammatic perspective view of a practical embodiment of a spectrometer.

Referring now to FIG. 16 this shows a practical embodiment of an interferometer incorporating an optical block of the type previously described. Thus a main housing 1 houses the optical block 2. An LED 3 supplies light of a predetermined wavelength to a optical fibre 4 which is bifurcated at 5 so as to direct light reflected from a test surface 6 onto a lens 7 which is arranged to input the reflected light to the optical block 2. Light issuing from the optical block 2 is collected by a lens 8 and focussed onto a photosensitive array 9, for example composed of CCD sensors. A unit 10 houses power for the LED and the CCD array and also provides in the form of a microprocessor output signals for controlling the sensor array in order to enable an output to be sent via an output port 11 to a suitable processor 12 where the results of the spectroscopy can be analysed and displayed on the screen 13 of the processor.

As will be appreciated the entire arrangement of the spectrometer can be encapsulated in a plastics material so that the components are rigidly held in the correct relationship and that the spectrometer is extremely resistant to shock and other adverse conditions.

Figure 17:
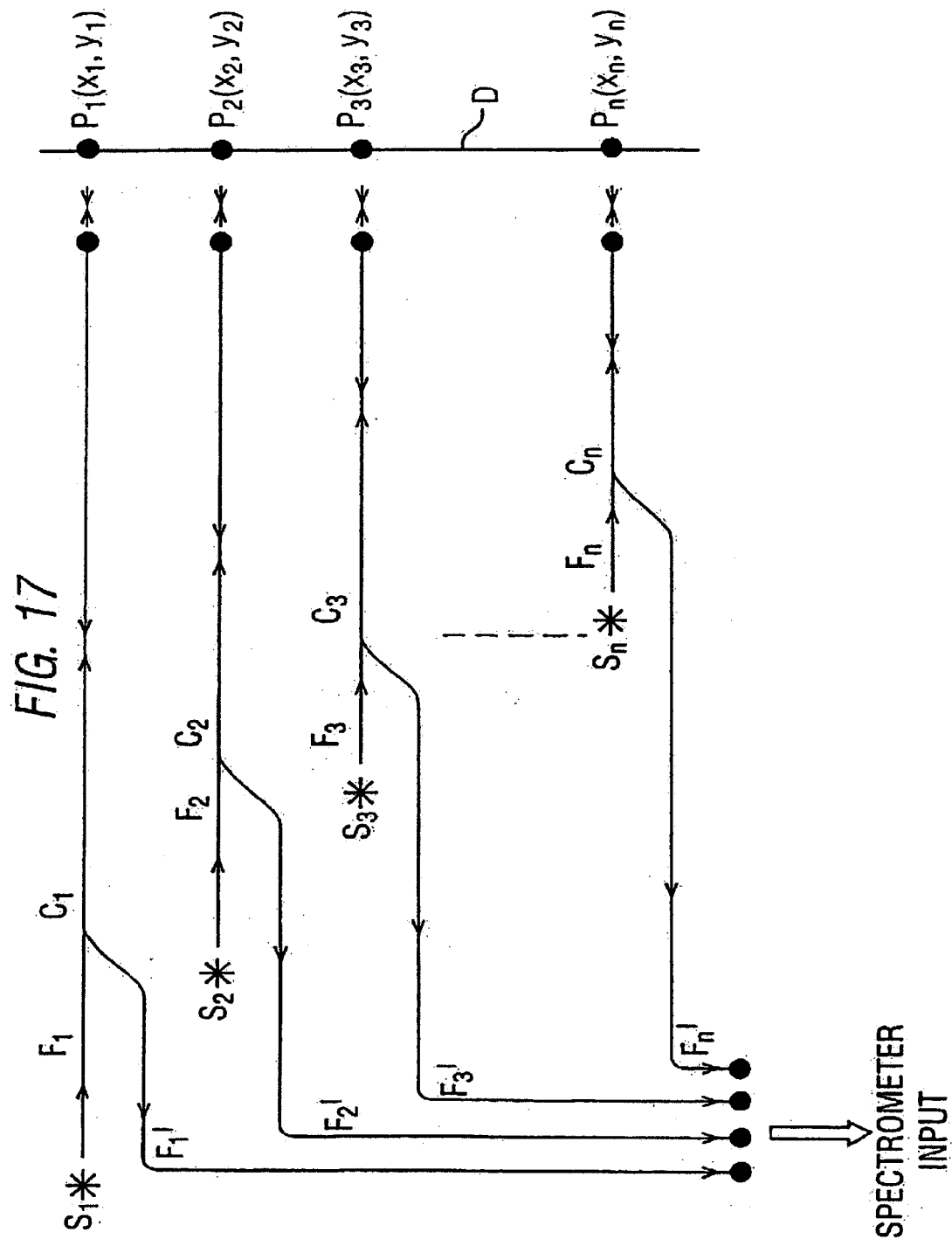
FIG. 17 is a diagrammatic representation of a variant of the spectrometer of FIG. 16.

Turning now to FIG. 17 of the accompanying drawings, this discloses one particular way in which spectrometers according to the present invention can be utilised. It will be appreciated that Fourier transform spectrometers do not require small input apertures as in the case for disbursive grating devices for which narrow input slips, typically less than 0.1 mm are required. With the embodiments described good results can be achieved with 2 mm diameter input fibre bundles. This means that the embodiment shown in FIG. 16 may be used to multiplex a number of light sources and points of measurement of the surface D into a single spectrometer. Thus in FIG. 16 the single LED may be replaced by a number of separate light sources all under the control of the microprocessor housed in unit 10. Similarly the optical fibre 4 is replaced by a plurality of parallel optical fibres each coupled to an individual light source and instead of a single output as shown in the figure, each of these light fibres have their outputs spread across at least one dimension of the target surface 6. Similarly the input to the lens 7 would be from the bundle of fibres as bifurcated at 5.

This arrangement is shown diagrammatically in FIG. 17. In FIG. 17 a number of light sources S1 to Sn and an equivalent number of points of measurement of a surface D, P1 to Pn, are coupled to a single spectrometer. Here light from the sources is first coupled into the fibres F1 to Fn and then to directional 3 dB (50:50) or bifurcated couplers C1 to Cn. The light is then coupled out of the fibres onto the object D. The light scattered/reflected from the points of measurement P1 to Pn in the object is coupled to the spectrometer via the 3 dB couplers and the output fibres F1 to Fn. As discussed S1 to Sn may be time multiplexed so that only one measurement point P is illuminated at a given time. Under these conditions a spectral image of the surface D may be synthesised from the time demultiplexed output of the spectrometer by the processor shown at 12.

The above arrangement can be configured in the transmissive mode using the fibre arrangement shown in FIG. 17. A similar dual fibre arrangement can also be used for reflective measurements.

Figure 18:
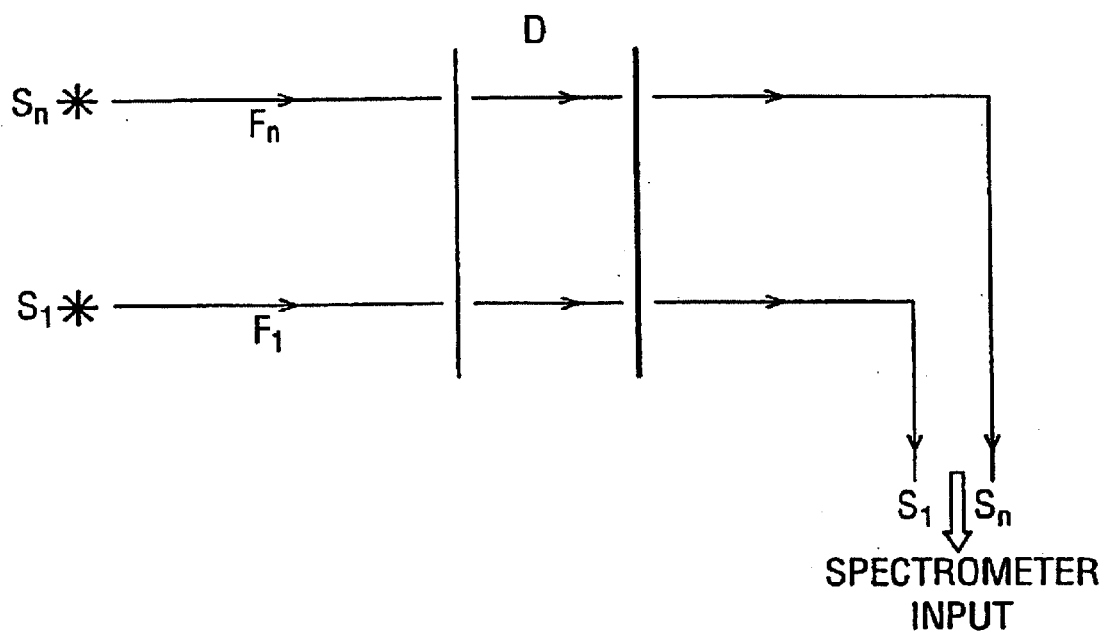
FIG. 18 is a similar view of another variant.
Figure 19:
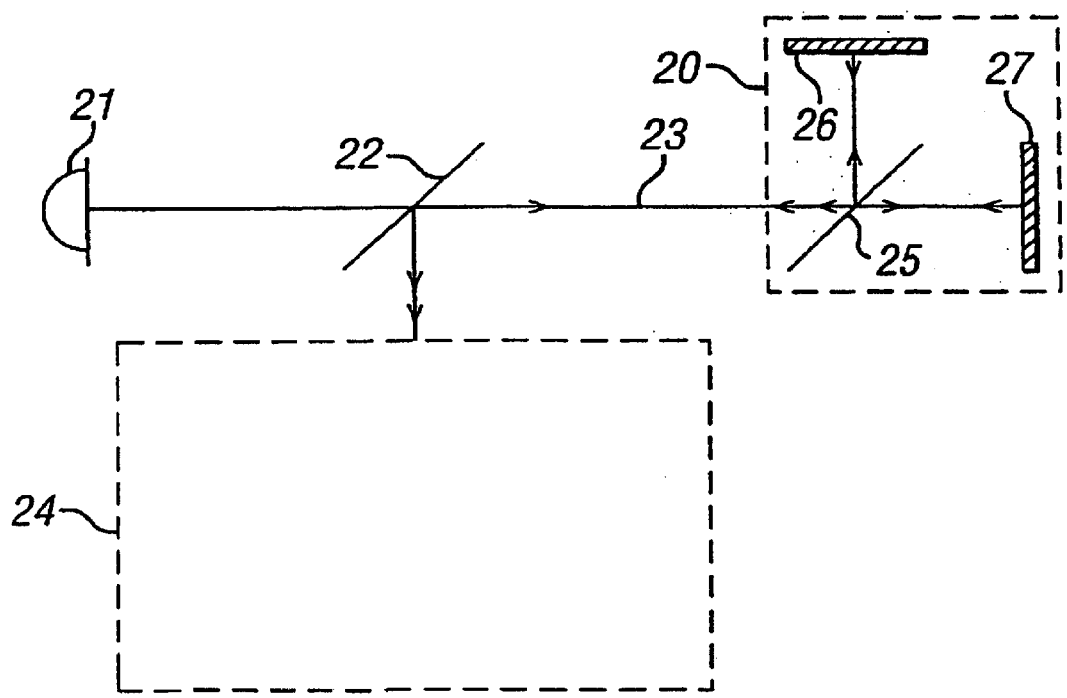
FIG. 19 is a diagram of a particular use of a spectrometer in accordance with the present invention.

Referring now to FIG. 18 this shows an embodiment in which a spectrometer in accordance with the present invention is combined with a remote sensing head 20 of rugged construction and receives light from a short coherence source 21 through a semi-reflective mirror 22 and an optical fibre link 23. After reflection in the sensing head 20 light is returned through the optical fibre link 23 to the mirror 22 and reflected into a Fourier transform spectrometer which can be identical to the spectrometer shown in FIG. 16 and which is, therefore, in accordance with the present invention.

The purpose of the arrangement shown in FIG. 18 is to separate the sensing head from the processing interferometer and to provide a sensing head which does not contain any active optical or electronic components but contains only passive optical elements which may accordingly be highly resistant to hostile environments. Thus the sensing head 20 comprises a beam splitter 25, a fixed reference mirror 26 and a movable mirror 214, the position of which changes in response to the measure and. The optical path lengths between the beam splitter 25 and the mirrors 26 and 27 are arranged to be different and the difference between these two path lengths is arranged to be substantially greater than the coherence length of source 21. As a result of this when the light reflected by the two mirrors 26 and 27 is recombined in the beam splitter 25, interference fringes will not be apparent in the combined beam supplied back to the optical fibre link 23. Thus the spectrometer 24 is arranged to compensate for the path length difference introduced in the remote sensing head 20 and generate a fringe field for which absolute phase changes occurring at the sensor can be determined.

It will be appreciated that as with the embodiment previously described a plurality of remote sensing heads can be used each associated with an individual coherent light source and the outputs of the various sensing heads combined into an optical fibre bundle for transmission to the Fourier transform spectrometer 24. Once again it is possible to control the lighting pattern of the coherent light sources so that the signals received by the spectrometer from the light sources and sensing heads are temporarily spaced for subsequent analysis by a computer system similar to that shown in FIG. 16.

It is of course possible that either an optical block similar to any one of those described in the preceding specification could be employed in the remote sensing head or heads of the embodiment just described.

What is claimed is:

1. An interferometric optical block having three planar nominally parallel surfaces with the two outer surfaces adapted to act as beam reflectors for internal light and the third surface in operation acting as a beam splitter and beam combiner, the optical block having an input portion by means of which an input beam of light to be analysed can be input so as partially to pass through said third surface to be internally reflected by one of said outer reflectors, and partially to be reflected by said third surface so as then to be internally reflected by the other of said outer reflectors whereby light internally reflected by said outer reflectors is combined at said third surface to produce an exit beam, and wherein said outer surfaces have an inclination with respect to one another and are asymmetric with respect to said third surface so as to generate in the exit beam a linear fringe field distributed about the zero-order fringe.

2. An optical block in accordance with claim 1, in which the exit beam results from the interference of the beams transmitted and reflected from the beam splitter/combiner that have in operation each undergone a single reflection at the outer reflectors.

3. An optical block in accordance with claim 1, which has been fabricated by cutting a single wedge element parallel to the wedge section to create two identical wedges and with one such wedge so cut rotated 180°, the lower face of said one wedge being secured to the other wedge to form a monolithic element which provides said optical block, the adjacent faces of the wedges forming said third surface.

4. An optical block in accordance with claim 1, in which the exit beam in operation results from the interference of beams combined at the beam splitter/combiner which have undergone two reflections at the outer reflectors.

5. An optical block in accordance with claim 1, in which the beam splitter/combiner and one reflector are formed by an optical flat with parallel faces and the other reflector is provided by a single unit comprising the inclined mirror or mirrors and an integral location for the optical flat.

6. An optical block in accordance with claim 1, in which the beam splitter/combiner and one reflector are formed by an optical flat with parallel faces and the other reflector by a solid prism with one plane face and an inclined second face, the block having been assembled by attaching the plane face of the solid prism to the plane beam splitter/combiner face of the optical flat.

7. An optical block in accordance with claim 1, fabricated from two identical solid dual angle prisms where the plane faces are attached to form the beam splitter combiner and the outer identical and mutually inclined faces form the reflectors.

8. An optical block in accordance with claim 7, in which the prisms have been obtained by cutting in two a single dual angle prism in a plane parallel to the dual angle section.

9. An optical block according to any one of the preceding claims, wherein in order to maximise optical throughput over the spectral range of operation, said beam splitter/combiner and reflector surfaces are coated with a coating such that the reflectivity coefficient of the reflectors is approximately 1.0 and the transmission coefficient and reflection coefficient being respectively 0.5 and 0.5 for the single reflection configuration and 0.66 and 0.33 for the dual reflection configuration.

10. An optical block in accordance with claim 1, including a lightguide or optical fibre associated with said input portion.

11. A Fourier Transform Spectrometer comprising an optical block as claimed in claim 1, a light source for directing light to be interferometrically analysed to the input portion of said block so that the light beams incident on the reflectors and the beam splitter/combiner do not overlap, and a light sensor array for detecting the pattern of the fringe field, the fringe field having a multiplicity of fringes about a zero order fringe so that a Fourier transform of said fringe pattern corresponds to the spectral distribution of the illumination source.

12. A spectrometer according to claim 11, comprising a lens system adapted to form an image of the optimum contrast fringe field as localised on a plane relative to the inteferometer onto said sensor array, and wherein said sensor array comprising is a pixellated semi-conductor array.

13. A spectrometer according to claim 12, and including electronic processor adapted to generate the Fourier transform of the electrical signal generated by said array so as to measure the spectral distribution of the input light.

14. A spectrometer according to claim 11, comprising means for coupling light to and from the measurement zone, imaging light into interferometer and imaging the fringe field light out of optical block onto the detector array form an integral element of the interferometer.

15. A spectrometer according to any one of claims 11–14, and comprising a plurality of light sources each associated with an optical fibre, and wherein each optical fibre is adapted to direct light from its associated light source either onto or through a test medium, and wherein light reflected by, scattered from or transmitted through the test medium is, in operation of the spectrometer, coupled to said light sensor.

16. A spectrometer according to claim 11, wherein the spectrometer includes means whereby the light sources can be illuminated at different intervals.

17. A spectrometer according to any one of claim 11, in combination with a remote sensor.

18. A spectrometer according to claim 17, wherein the remote sensor is adapted to receive light from a coherence source through a semi-reflective mirror and includes means for separating light received from the coherence light source into two paths the lengths of which differ by a distance greater than the coherence length of the coherence light source.

19. A spectrometer according to claim 18, wherein the sensing head comprises a beam splitter, a fixed reference mirror and a movable mirror the position of which changes in response to a measurand.

20. A method of manufacturing an interferometric optical block having three planar nominally parallel surfaces with the two outer surfaces adapted to act as beam reflectors for internal light and the third surface in operation acting as a beam splitter and beam combiner, the optical block having an input portion by means of which an input beam of light to be analysed can be input so as partially to pass through said third surface to be internally reflected by one of said outer reflectors, and partially to be reflected by said third surface so as then to be internally reflected by the other of said outer reflectors whereby light internally reflected by said outer reflectors is combined at said third surface to produce an exit beam, and wherein said outer surfaces have an inclination with respect to one another and are asymmetric with respect to said third surface so as to generate in the exit beam a linear fringe field distributed about the zero-order fringe comprising cutting a single wedge element parallel to the wedge section to create two identical wedges and with one such wedge so cut rotated 180°, the lower face of said one wedge being secured to the other wedge to form a monolithic element which provides said optical block, the adjacent faces of the wedges forming said third surface.

* * * * *